(12) United States Patent
Berczik et al.

(10) Patent No.: US 7,763,356 B2
(45) Date of Patent: Jul. 27, 2010

(54) BOND COATING AND THERMAL BARRIER COMPOSITIONS, PROCESSES FOR APPLYING BOTH, AND THEIR COATED ARTICLES

(75) Inventors: Douglas M. Berczik, Manchester, CT (US); David A. Litton, Rocky Hill, CT (US); Melvin Freling, West Hartford, CT (US); Kevin W. Schlichting, Storrs, CT (US)

(73) Assignee: United Technologies Corporation, Hartford, CT (US)

( * ) Notice: Subject to any disclaimer, the term of this patent is extended or adjusted under 35 U.S.C. 154(b) by 372 days.

(21) Appl. No.: 11/375,553

(22) Filed: Mar. 13, 2006

(65) Prior Publication Data

US 2010/0104859 A1 Apr. 29, 2010

(51) Int. Cl.
*C04B 35/58* (2006.01)
*B32B 15/04* (2006.01)

(52) U.S. Cl. ............ 428/446; 428/701; 428/702; 428/698; 428/547; 428/610; 428/310.5; 428/336; 428/704; 428/448; 428/469; 427/372.2

(58) Field of Classification Search .............. None
See application file for complete search history.

(56) References Cited

U.S. PATENT DOCUMENTS

| | | | |
|---|---|---|---|
| 5,308,806 A * | 5/1994 | Maloney et al. | 501/95.2 |
| 6,200,691 B1 | 3/2001 | Moore et al. | |
| 6,245,439 B1 * | 6/2001 | Yamada et al. | 428/546 |
| 6,312,763 B1 | 11/2001 | Eaton, Jr. et al. | |
| 6,391,811 B1 | 5/2002 | Hebsur | |
| 6,652,674 B1 | 11/2003 | Woodard et al. | |
| 6,733,908 B1 * | 5/2004 | Lee et al. | 428/702 |
| 6,759,151 B1 * | 7/2004 | Lee | 428/701 |
| 7,056,574 B2 | 6/2006 | Ojard et al. | |
| 7,060,360 B2 | 6/2006 | Eaton et al. | |
| 7,063,894 B2 | 6/2006 | Sun et al. | |
| 7,407,718 B2 * | 8/2008 | Hazel et al. | 428/701 |
| 2002/0119340 A1 | 8/2002 | Zhao et al. | |
| 2003/0175558 A1 | 9/2003 | Kim et al. | |
| 2004/0219295 A1 | 11/2004 | Perepezko et al. | |
| 2005/0042461 A1 | 2/2005 | Li et al. | |
| 2005/0079343 A1 | 4/2005 | Raybould et al. | |
| 2006/0140771 A1 * | 6/2006 | Carper et al. | 416/241 R |

FOREIGN PATENT DOCUMENTS

WO WO9622402 * 7/1996

OTHER PUBLICATIONS

European Search Report for EP 07250080.4, dated Jul. 11, 2008.

* cited by examiner

*Primary Examiner*—Jennifer McNeil
*Assistant Examiner*—Vera Katz
(74) *Attorney, Agent, or Firm*—Bachman & LaPointe, P.C.

(57) ABSTRACT

A coated article includes an article having at least one surface and composed of a molybdenum based refractory metal alloy base substrate, a niobium based refractory metal alloy base substrate or a silicon base substrate. A bond coat layer is disposed upon the surface. The bond coat layer includes a molybdenum disilicide base compound and at least one of the following: silicon nitride, silicon carbide or tantalum oxide. A process for coating the article includes the steps of applying upon the article's surface the aforementioned bond coat layer. A functionally graded material layer is applied upon the bond coat layer. The functionally graded material layer comprising molybdenum disilicide, mullite and at least one of the following: silicon nitride, silicon carbide or tantalum oxide. A thermal barrier coating layer is then applied upon the functionally graded material layer.

11 Claims, 3 Drawing Sheets

BOND COATING AND THERMAL BARRIER COMPOSITIONS, PROCESSES FOR APPLYING BOTH, AND THEIR COATED ARTICLES

STATEMENT OF GOVERNMENT RIGHTS

The Government of the United States of America may have rights in the present invention under Contract No. N00421-99-3-1608 awarded by the U.S. Navy.

FIELD OF USE

The present invention relates to coatings and, more particularly, relates to bond and thermal barrier coating(s) and their composition(s), process(es) for applying same, and their coated article(s).

BACKGROUND OF THE INVENTION

Silicon base ceramics exhibit accelerated oxidation rates in high temperature, aqueous environments such as for example, the combustor and turbine sections of gas turbine engines. In order to reduce the rate of oxidation on silicon base substrates used as ceramic components in such environments, significant effort has been given to providing environment barrier coating, i.e., barrier layer(s), for the silicon base substrates so as to increase the service life of such component parts.

With reference to FIGS. 1a and 1b, prior art environmental barrier coatings form a composite 10 comprising a silicon base substrate 12, a bond coat or layer 14 such as a dense continuous layer of silicon metal, a barrier layer 16 such as either an alkaline earth aluminosilicate base on barium and strontium, or yttrium silicate, and an optional top layer such as a refractory oxide and/or silicate layer 18 or other metal oxide such as for example zirconium oxide. In addition, all intermediate layer 20 may be provided between the 14 bond coat and the barrier 16 and/or between the barrier layer 16 and the top layer 18. The intermediate layer comprises, for example, a mixture of the barrier layer material with an additional oxide such as mullite. These prior art environmental barrier systems have proved for many silicon base substrates to be protective with respect to oxidation of the silicon base substrate and, in addition, are adherent. However, it has now been found that certain mechanical properties of some silicon containing substrates especially those substrates having CTE's less than silicon and those which are brittle, such as silicon nitride, suffer a significant reduction in 4-point bend strength at room temperature.

Naturally, it would be highly desirable to provide environmental barrier coatings for silicon containing substrates such as silicon nitride which do not result in significant loss of mechanical properties.

Accordingly, this is a principal object of the present invention to provide bond coats for silicon base, molybdenum base and niobium base substrates which does not have significant adverse affect with respect to mechanical properties.

SUMMARY OF THE INVENTION

In accordance with the present invention, a process for coating an article broadly comprises applying upon at least one surface of a molybdenum based refractory metal alloy base or niobium based refractory metal alloy base substrate a bond coat material layer broadly comprising a molybdenum disilicide base compound and a silicon nitride base compound.

In accordance with another aspect of the present invention, a coated article broadly comprises an article having at least one surface and broadly comprised of a molybdenum based refractory metal alloy or a niobium based refractory metal alloy; a bond coat layer disposed upon said at least one surface, said bond coat layer includes a molybdenum disilicide base compound and a silicon nitride base compound.

In accordance with another aspect of the present invention, a process for coating an article broadly comprises applying upon at least one surface of a molybdenum based refractory metal alloy base or niobium based refractory metal alloy base substrate a bond coat material layer comprising a molybdenum disilicide base compound and a silicon nitride base compound; applying upon the bond coat material layer a functionally graded material layer broadly comprising molybdenum disilicide, mullite and at least one of the following: silicon nitride, silicon carbide or tantalum oxide; and applying upon the functionally graded material layer a thermal barrier coating layer.

In accordance with yet another aspect of the present invention, a coated article broadly comprises an article having at least one surface and comprised of a molybdenum based refractory metal alloy or a niobium based refractory metal alloy; a bond coat layer disposed upon the at least one surface, the bond coat layer includes a molybdenum disilicide base compound and a silicon nitride base compound; a functionally graded material layer disposed upon the bond coat layer, the functionally graded material layer comprising molybdenum disilicide, mullite and at least one of the following: silicon nitride, silicon carbide or tantalum oxide; and a thermal barrier coating layer disposed upon the bond coat layer.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
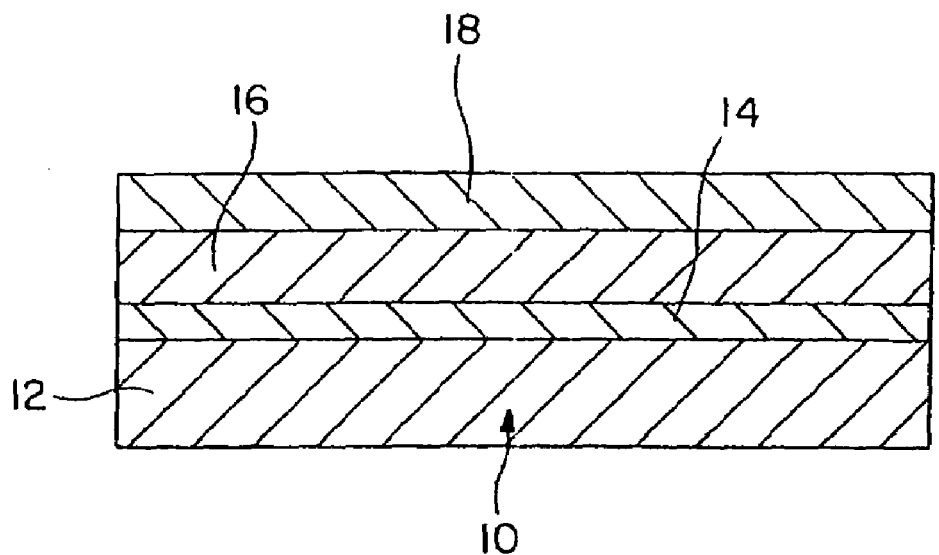
FIG. 1a is a schematic illustration of a composite article made in accordance with the prior art.
Figure 1B:
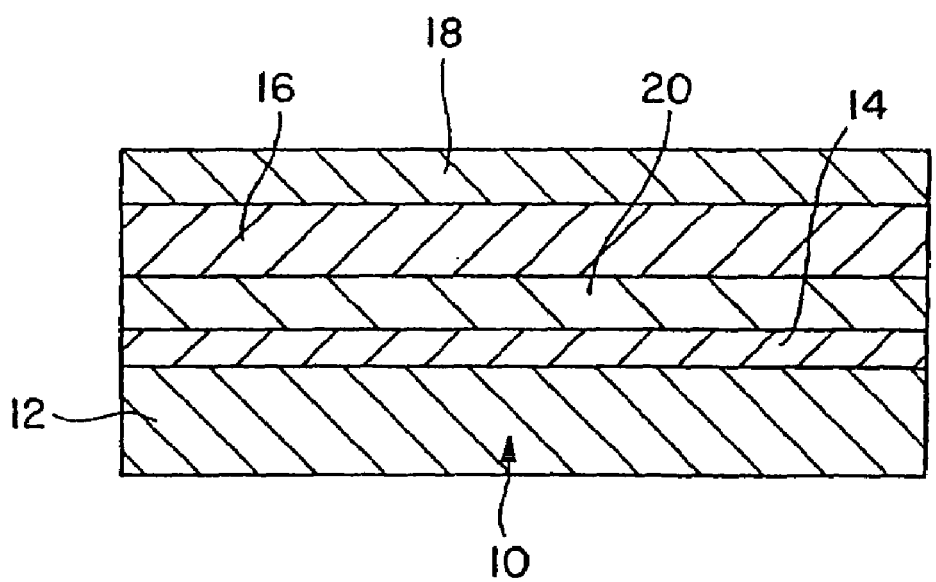
FIG. 1b is a schematic illustration of a composite article made in accordance with the prior art.
Figure 2:
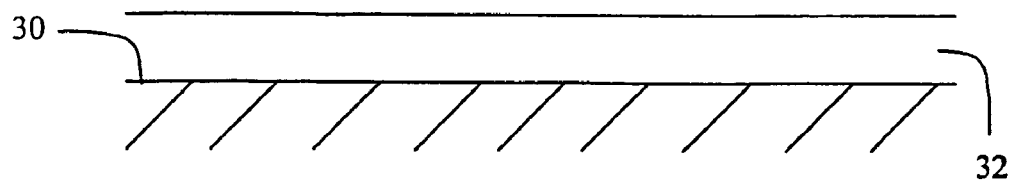
FIG. 2 is a representation of a substrate coated with a bond coat material of the present invention.
Figure 3:
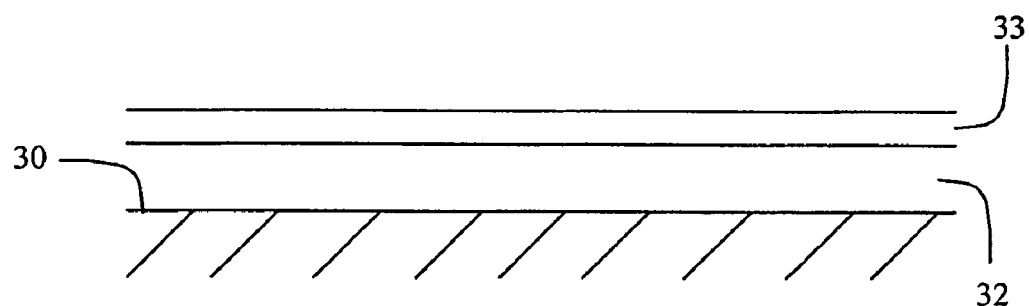
FIG. 3 is a representation of a substrate coated with a bond coat material and protective silica scale of the present invention.
Figure 4:
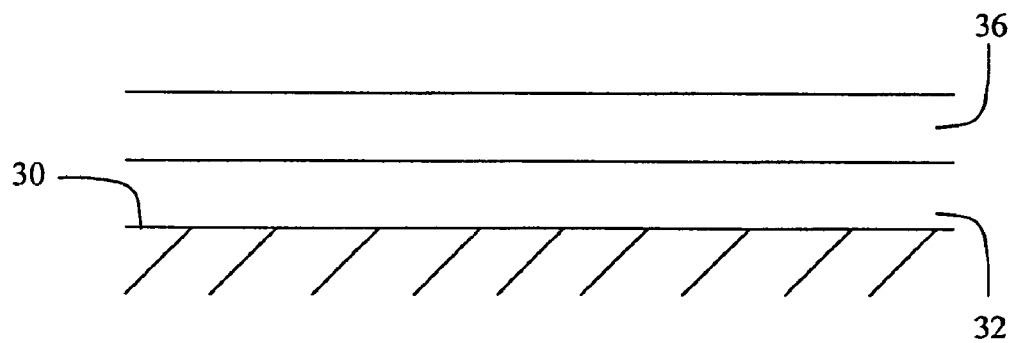
FIG. 4 is a representation of a substrate coated with a bond coat material and functionally graded material layer of the present invention.
Figure 5:
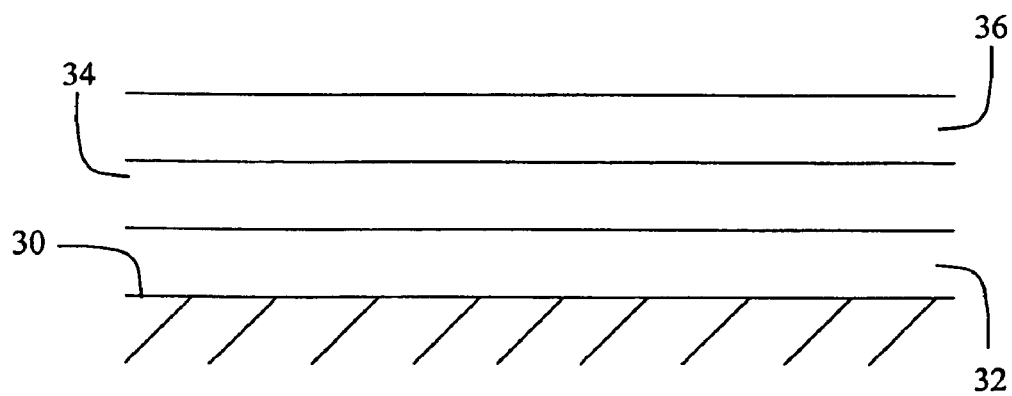
FIG. 5 is a representation of a substrate coated with a bond coat material, a functionally graded material layer and a thermal barrier coating layer of the present invention.

By the term "functionally graded" it is meant that the materials are co-deposited as known and understood by one of ordinary skill in the art, steadily richening the composition of the coating material until only the coating material is being deposited.

Referring generally now to FIGS. 2-5, an article 30 comprising a niobium based refractory metal alloy base or molybdenum based refractory metal alloy base substrate and a bond coat layer 32. The bond coat layer 32 may generally comprise a silica compatible molybdenum disilicide base material. A functionally graded material layer 34 may be disposed upon the bond coat layer 32. A thermal barrier coating layer 36 may be disposed upon the functionally graded material layer 34, if present, or directly upon the bond coat layer 32.

The article 30 may comprise a niobium based refractory metal alloy base substrate or a molybdenum based refractory metal alloy base substrate. These base substrates form a protective silica scale 33 at high temperatures analogous to the alumina scale for nickel-based superalloys. Molybdenum-based refractory metal alloys, for example, when compared to nickel-based superalloys, exhibit higher melting points (about 4,000° F.-5,000° F.), higher thermal conductivity (about 690 BTU-in/hr ft$^2$-° F.), low thermal expansion (about $3.5 \times 10^{-6}$/° F.), and high modulus. Suitable molybdenum based refractory metal alloys may comprise about 91 weight percent to 98.5 weight percent of molybdenum, about 1.5 weight percent to 4.5 weight percent of silicon and about 0.5 weight percent to 4.5 weight percent of boron base upon the weight of said alloy. In addition, a silicon base substrate may also be employed. The silicon base substrate may be a silicon ceramic substrate or a silicon containing metal. Suitable silicon base substrate include, but are not limited to, silicon carbide, silicon nitride, and the like, and comprise a silicon containing matrix with reinforcing materials such as fibers, particles and the like, as known to one of ordinary skill in the art.

The bond coat layer 32 may comprise a silica compatible molybdenum disilicide base material with additions of a silicon nitride base material, e.g., $MoSi_2$ and $Si_3N_4$. $MoSi_2$ has a high melting point (about 3398° F.) and forms a silica scale when oxidized which is compatible with a silica-forming alloy such as the molybdenum-based refractory metal alloy base substrate of article 30. However, $MoSi_2$ possesses a high coefficient of thermal expansion (hereinafter referred to as "CTE") (about $5.5 \times 10^{-6}$/° F.) when compared to typical refractory metal alloy substrates, low fracture toughness, and poor high temperature creep strength. The addition of $Si_3N_4$ (CTE about $3 \times 10^{-6}$/° F.) can improve the creep strength by a factor of 5, the room temperature fracture toughness by a factor of 2, and lower the CTE of the $MoSi_2$. Additional materials exhibiting low coefficients of thermal expansion may be added to the bond coat composition. Suitable low CTE materials include SiC, $Ta_2O_5$, and the like. In the alternative, $Si_3N_4$ may be substituted with one or more of the aforementioned low CTE materials. Generally, suitable bond coat layers may comprise about 10 percent by weight to 40 percent by weight of silicon nitride and about 60 percent by weight to 90 percent by weight of molybdenum disilicide based upon the weight of the bond coat layer.

The functionally graded material layer 34 may generally comprising molybdenum disilicide, mullite and at least one of the following: silicon nitride, silicon carbide or tantalum oxide. The functionally graded material layer 34 is designed to minimize thermomechanical incompatibility at interfaces between two different materials. As is understood by one of ordinary skill in the art, the functionally graded material layer 34 steadily increases in mullite composition from the interface with the bond coat layer 32 and eventually becomes pure mullite, that is, 100% by weight of mullite based upon the weight of the functionally graded material layer, at the interface with the thermal barrier coating layer 36.

The thermal barrier coating layer 36 may generally comprise an alumina containing ceramic, e.g., mullite, zircon ($ZrSiO_4$), rare earth silicates, combinations of at least one of the foregoing, and the like. Suitable rare earth silicates include, but are not limited to, yttrium silicate, yttrium disilicate, magnesium aluminate spinel, and the like. Alumina containing ceramics provide chemical stability with respect to a silica scale. For example, mullite offers a high melting point, i.e., 3,500° F., a low thermal conductivity (about 24 BTU-in/hr ft$^2$-° F.), and a low CTE (about $3 \times 10^{-6}$/° F.).

Figure 6:
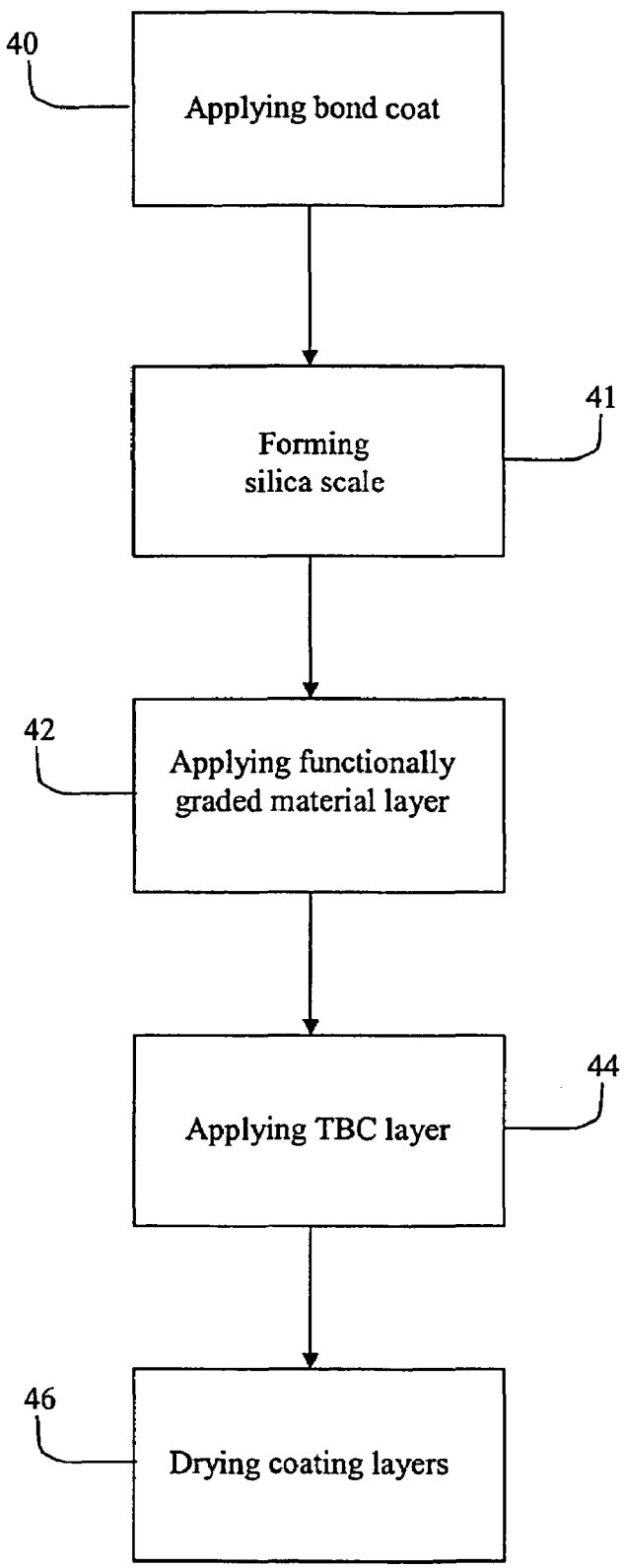
FIG. 6 is a flowchart of a coating process of the present invention.

Referring now to FIG. 6, the bond coat layer 32 may be applied to at least one surface of the article 30 as shown at step 40 of FIG. 6. The bond coat layer 32 may be applied using an application process such as, but not limited to, plasma spraying processes (e.g., APS, LPPS, etc.), sol gel processes and slurry processes. Preferably, the bond coat layer 32 is applied to the article's surface(s) using a plasma spray process, e.g., air plasma spray, as known to one of ordinary skill in the art. As a result of applying and subjecting bond coat materials to high processing temperatures, a protective silica scale 33 may form as shown at step 41 of FIG. 6.

The functionally graded material layer 34 may be applied as described herein upon the bond coat layer 32 as shown at step 42 of FIG. 6. Suitable co-deposition processes may be utilized as known to one of ordinary skill in the art.

The thermal barrier coating layer 36 may be applied upon the functionally graded material layer 34 as shown at step 44 of FIG. 6. Suitable application processes may be utilized as known to one of ordinary skill in the art.

The coated surfaces of article 30, that is, the coating layers 32, 34 and 36, may then be dried using suitable heat treating or drying processes as known to one of ordinary skill in the art.

Referring again to FIG. 4, the bond coat layer 32 may have a thickness of about 1 mil to 50 mils, when the thermal barrier coating layer 36 is not present. Referring again to FIG. 5, the bond coat layer 32 may have a thickness of about 1 mil to 20 mils, and preferably about 1 mil to 10 mils, when the thermal barrier coating layer 36 is present.

Various articles may be coated using the bond coat materials and thermal barrier compositions described herein. The excellent mechanical properties at high temperatures of molybdenum and niobium based refractory metal alloys with compatible thermal barrier coating systems, such as molydisilicide based bond coats and mullite, make them well suited for use with gas turbine engine components. Suitable gas turbine engine components include, but are not limited to, seals, e.g., blade outer air seals; combustor panels, turbine blades and vanes, nozzle components, and liners.

Experimental Section

A series of molybdenum refractory metal alloy substrates (hereinafter referred to as "MRAs") were coated with mullite, silica, $MoSi_2$, a mixture of 70 $MoSi_2$/30 $Si_3N_4$, a mixture of 50 $MoSi_2$/50 $Si_3N_4$, respectively, to form a bond coat layer on each MRA. The coated MRAs were then subjected to heat at the various temperature ranges (° F.) listed in Table 1 and certain mechanical properties of each coating were measured.

TABLE 1

| T Range | | | Mullite | Silica | MoSi$_2$ | 70 MoSi$_2$/30 Si$_3$N$_4$ | 50 MoSi$_2$/50 Si$_3$N$_4$ | MRA |
|---|---|---|---|---|---|---|---|---|
| 2500 | 2100 | Young's Modulus (ksi) | 5000 | 2500 | 25000 | 28000 | 29000 | 38000 |
| | | Poisson's Ratio | 0.3 | 0.4 | 0.17 | 0.24 | 0.25 | 0.38 |
| | | CTE (ppm/F) | 2.8 | 5 | 5.5 | 4.19 | 3.92 | 4.25 |
| 2100 | 1700 | Young's Modulus (ksi) | 8000 | 5000 | 33000 | 32500 | 32000 | 41000 |
| | | Poisson's Ratio | 0.26 | 0.3 | 0.168 | 0.23 | 0.24 | 0.35 |
| | | CTE (ppm/F) | 2.69 | 1 | 5.3 | 4.12 | 3.9 | 3.9 |
| 1700 | 1300 | Young's Modulus (ksi) | 11000 | 8000 | 37500 | 36500 | 36000 | 43500 |
| | | Poisson's Ratio | 0.26 | 0.22 | 0.166 | 0.22 | 0.23 | 0.33 |
| | | CTE (ppm/F) | 2.58 | 0.5 | 5.15 | 4 | 3.58 | 3.6 |
| 1300 | 900 | Young's Modulus (ksi) | 11000 | 9000 | 40000 | 39000 | 38500 | 45500 |
| | | Poisson's Ratio | 0.26 | 0.2 | 0.164 | 0.21 | 0.22 | 0.31 |
| | | CTE (ppm/F) | 2.44 | 0.4 | 5 | 3.78 | 3.25 | 3.3 |
| 900 | 500 | Young's Modulus (ksi) | 11000 | 9500 | 42500 | 41500 | 40750 | 47000 |
| | | Poisson's Ratio | 0.25 | 0.2 | 0.161 | 0.205 | 0.21 | 0.3 |
| | | CTE (ppm/F) | 2.22 | 0.3 | 4.7 | 3.45 | 3.08 | 3.15 |
| 500 | 77 | Young's Modulus (ksi) | 11000 | 10000 | 45000 | 43000 | 42750 | 48000 |
| | | Poisson's Ratio | 0.24 | 0.2 | 0.15 | 0.198 | 0.203 | 0.29 |
| | | CTE (ppm/F) | 1.56 | 0.25 | 4.4 | 3.28 | 2.95 | 3 |

Referring now to Table 1, the experimental results demonstrate that bond coats comprising either a mixture of 70 MoSi$_2$/30 Si$_3$N$_4$ or a mixture of 50 MoSi$_2$/50 Si$_3$N$_4$ exhibit CTEs closer to the MRA substrate CTE than the CTEs of any one of mullite, silica or moly-disilicide taken alone at various temperature ranges. As described herein, mullite alone may be employed as the thermal barrier coating. Although the mullite CTE and either the 70 MoSi$_2$/30 Si$_3$N$_4$ mixture CTE or the 50 MoSi$_2$/50 Si$_3$N$_4$ mixture CTE are not close, the functionally graded layer described herein serves to minimize thermomechanical incompatibility at the bond coat layer to thermal barrier coating layer interface. Due to the composition of the functionally graded material layer described herein the functionally graded material layer CTE will possess a CTE having a range, e.g., between about $3.0 \times 10^{-6}/°$ F. to $4.5 \times 10^{-6}/°$ F., encompassing both the bond coat layer CTE and the thermal barrier coating layer CTE.

The bond coat composition, thermal barrier coating composition and processes for applying the same to an article exhibit advantages over the prior art. The use of a functionally graded material layer minimizes stresses experienced between coating interfaces and lessens the likelihood that the bond coat and/or thermal barrier coating do not spall, pest, and the like, prior to achieving the intended useful service life of the coated article, part, etc. By employing a plasma spraying process, the process of the present invention may be operated more efficiently at less cost and in less time, and larger amounts of Si$_3$N$_4$ may be incorporated that are optimal to minimizing stresses without experiencing typical operating obstacles known to one of ordinary skill in the art.

It is to be understood that the invention is not limited to the illustrations described and shown herein, which are deemed to be merely illustrative of the best modes of carrying out the invention, and which are susceptible to modification of form, size, arrangement of parts, and details of operation. The invention rather is intended to encompass all such modifications which are within its spirit and scope as defined by the claims.

What is claimed is:

1. A coated article, comprising:
a turbine engine component having at least one surface;
said turbine engine component comprised of a molybdenum based refractory metal alloy or a niobium based refractory metal alloy;
a bond coat layer disposed upon said at least one surface, said bond coat layer consisting of from 50 to 90 percent by weight of a molybdenum disilicide base compound, from 10 to 50 percent by weight of silicon nitride, and optionally at least one of the following: silicon carbide and tantalum oxide; and a functionally graded material layer disposed upon said bond coat layer, said functionally graded material layer comprising molybdenum disilicide, mullite and at least one of the following: silicon nitride, silicon carbide or tantalum oxide, said functionally graded material layer increasing in mullite composition from an interface with said bond coat layer so that said functionally graded material layer has 100% by weight mullite at an interface with a thermal barrier coating layer.

2. The article of claim 1, further comprising a thermally grown oxide layer disposed upon said bond coat layer.

3. The article of claim 1, wherein said functionally graded material layer has a coefficient of thermal expansion between about $3.0 \times 10^{-6}/°$ F. and $4.5 \times 10^{-6}/°$ F.

4. The article of claim 1, further comprising said thermal barrier coating layer being disposed upon said functionally graded material layer.

5. The article of claim 4, wherein said bond coat layer has a thickness of about 1 mil to 20 mils.

6. The article of claim 1, further comprising a thermal barrier coating layer disposed upon said bond coat, said thermal barrier coating comprises a material selected from the group consisting of mullite, zirconium silicate, yttrium silicate, yttrium disilicate, and magnesium aluminate spinel.

7. The coated article of claim 1, wherein said molybdenum base refractory metal alloy consists of about 91 weight percent to 98.5 weight percent of molybdenum, about 1.5 weight percent to 4.5 weight percent of silicon and about 0.5 weight percent to 4.5 weight percent of boron based upon the weight of said alloy.

8. The coated article of claim 1, wherein said bond coat layer consists of about 10 percent by weight to 40 percent by weight of silicon nitride base compound and about 60 percent by weight to 90 percent by weight of molybdenum disilicide base compound based upon the weight of said bond coat layer.

9. The coated article of claim 1, wherein said gas turbine engine component is selected from the group consisting of seals, combustor panels, blades, vanes, liners, nozzles and nozzle components.

10. The coated article of claim 1, wherein said bond coat layer comprises a thickness of about 1 mil to 50 mils.

11. A coated article, comprising:

a turbine engine component having at least one surface;

said turbine engine component comprised of a molybdenum based refractory metal alloy, a niobium based refractory metal alloy or a silicon base; and a bond coat layer disposed upon said at least one surface, said bond coat layer consisting of from 50 to 90 percent by weight of a molybdenum disilicide base compound, from 10 to 50 percent by weight of silicon nitride, and optionally at least one of the following: silicon carbide or and tantalum oxide;

a functionally graded material layer disposed upon said bond coat layer, said functionally graded material layer comprising molybdenum disilicide, mullite and at least one of the following: silicon nitride, silicon carbide or tantalum oxide, said functionally graded material layer increasing in mullite composition from an interface with said bond coat layer so that said functionally graded material layer has 100% by weight mullite at an interface with a thermal barrier coating layer, said functionally graded material layer having a coefficient of thermal expansion between about $3.0 \times 10^{-6}/°$ F. and $4.5 \times 10^{-6}/°$ F.; and a thermal barrier coating layer disposed upon said bond coat layer.

* * * * *